United States Patent
Watanabe

(10) Patent No.: US 10,327,125 B2
(45) Date of Patent: Jun. 18, 2019

(54) COMMUNICATION APPARATUS, CONTROL METHOD FOR COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Ryo Watanabe, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/018,747

(22) Filed: Jun. 26, 2018

(65) Prior Publication Data

US 2019/0007815 A1    Jan. 3, 2019

(30) Foreign Application Priority Data

Jun. 30, 2017  (JP) .................... 2017-129597

(51) Int. Cl.
*H04B 7/00* (2006.01)
*H04W 24/00* (2009.01)
*H04W 4/80* (2018.01)
*H04W 76/14* (2018.01)

(52) U.S. Cl.
CPC ............. *H04W 4/80* (2018.02); *H04W 76/14* (2018.02)

(58) Field of Classification Search
CPC ....... H04W 4/80; H04W 76/14; H04W 84/18; H04B 17/00; H04M 1/7253

USPC ........ 455/41.1, 41.2, 41.3, 423, 425, 552.1, 455/553.1

See application file for complete search history.

(56) References Cited

U.S. PATENT DOCUMENTS

| | | | | |
|---|---|---|---|---|
| 8,081,714 B2* | 12/2011 | Ibrahim | ............... | H03D 3/006 375/315 |
| 8,121,545 B2* | 2/2012 | Stahl | .................... | H04W 74/08 455/41.2 |
| 9,379,856 B2* | 6/2016 | Khoryaev | ............ | H04W 48/16 |
| 9,507,958 B2* | 11/2016 | Uekubo | ............... | G06Q 10/10 |
| 10,164,611 B2* | 12/2018 | Rokhsaz | .................. | H03J 3/04 |
| 2003/0181213 A1* | 9/2003 | Sugar | .................... | H04W 16/14 455/454 |
| 2016/0183077 A1* | 6/2016 | Wang | .................... | H04W 4/80 455/41.2 |

FOREIGN PATENT DOCUMENTS

WO        9703404 A1    1/1997

* cited by examiner

*Primary Examiner* — Quochien B Vuong
(74) *Attorney, Agent, or Firm* — Carter, DeLuca & Farrell LLP

(57) ABSTRACT

A communication apparatus for performing intermittent communication with a service providing first apparatus and a service using second apparatus, respectively, using a communication method complying with a Bluetooth standard, acquires a first frequency as a communication frequency in the intermittent communication with the first apparatus and a second frequency as a communication frequency in the intermittent communication with the second apparatus, and transmits, to the second apparatus, a request to change the second frequency to a communication frequency determined based on the first frequency.

13 Claims, 11 Drawing Sheets

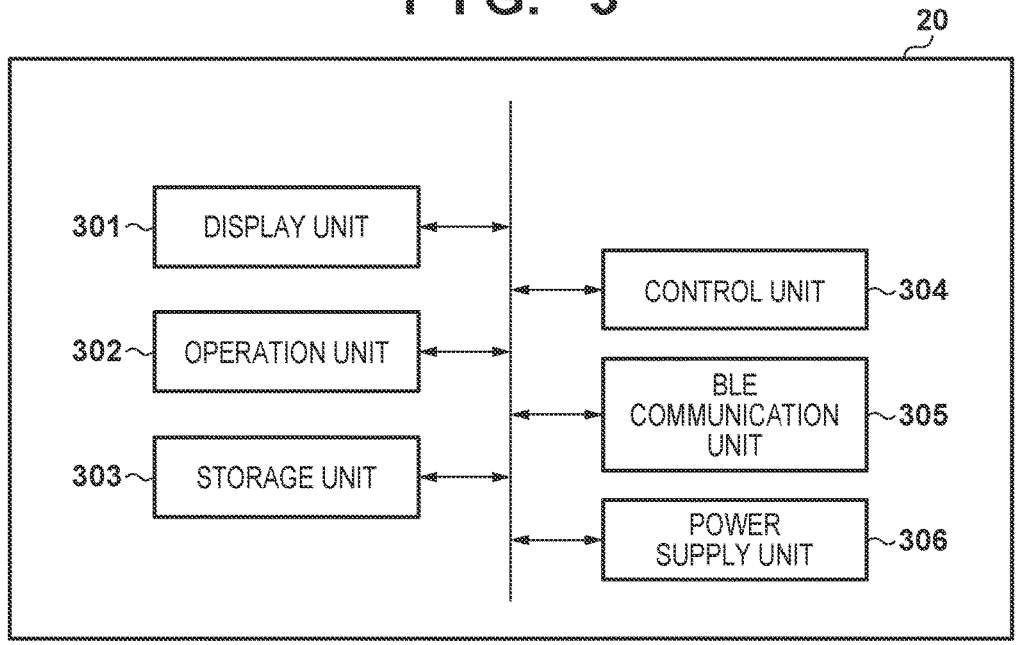
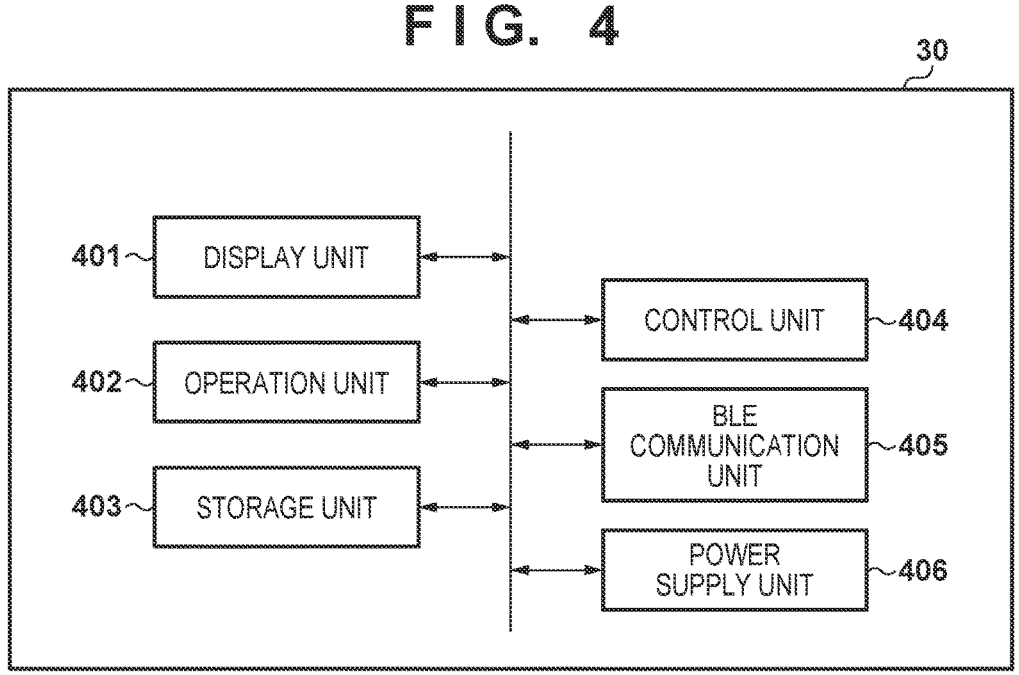

COMMUNICATION APPARATUS, CONTROL METHOD FOR COMMUNICATION APPARATUS, AND NON-TRANSITORY COMPUTER-READABLE STORAGE MEDIUM

BACKGROUND OF THE INVENTION

Field of the Invention

The present invention relates to a communication apparatus, a control method for the communication apparatus, and a non-transitory computer-readable storage medium.

Description of the Related Art

In recent years, a network system has been put into practical use, in which a communication apparatus collects, via communication by a predetermined communication method, information (measurement data and the like) transmitted from a node apparatus including a sensor and uses it as additional information of a provided service. Examples of the predetermined communication method are Wi-Fi, LTE (Long Term Evolution), Bluetooth®, BLE (Bluetooth Low Energy), and Zigbee.

International Publication No. 97/03404 teaches a technique in which a communication apparatus forming the first network joins another second network, and transfers, to an appropriate node apparatus in the first network, a service providing request received from an information processing apparatus serving as a service request apparatus.

The above-described conventional technique does not mention communication synchronization between the node apparatus and the communication apparatus and between the communication apparatus and the information processing apparatus. Consequently, if a communication method such as Bluetooth in which communication is performed intermittently at a predetermined time interval is used, it is impossible to perform efficient communication. Consider, for example, a case in which a communication interval between the information processing apparatus and the communication apparatus is 100 msec and a communication interval between the communication apparatus and the node apparatus is 200 msec. In this case, a wasteful transmission/reception timing at which the information processing apparatus and the communication apparatus attempt to communicate with each other in a state in which no new information is provided from the node apparatus occurs every other time. Consider, for example, a case in which the communication interval between the information processing apparatus and the communication apparatus is 200 msec and the communication interval between the communication apparatus and the node apparatus is 100 msec. In this case, since the information processing apparatus and the communication apparatus communicate with each other when the node apparatus provides new information twice, one of the two pieces of provided information loses the real time property, thereby causing wasteful transmission/reception.

SUMMARY OF THE INVENTION

The present invention provides a technique for appropriately setting a communication frequency between a plurality of networks in consideration of the above problems.

According to one aspect of the present invention, there is provided a communication apparatus for performing intermittent communication with a service providing first apparatus and a service using second apparatus, respectively, using a communication method complying with a Bluetooth standard, comprising: an acquisition unit configured to acquire a first frequency as a communication frequency in the intermittent communication with the first apparatus and a second frequency as a communication frequency in the intermittent communication with the second apparatus; and a request unit configured to transmit, to the second apparatus, a request to change the second frequency to a communication frequency determined based on the first frequency.

Further features of the present invention will become apparent from the following description of exemplary embodiments (with reference to the attached drawings).

BRIEF DESCRIPTION OF THE DRAWINGS

FIG. 3 is a schematic block diagram showing the hardware arrangement of a smart device 20;

FIG. 4 is a schematic block diagram showing the hardware arrangement of an in-vehicle communication apparatus 30;

DESCRIPTION OF THE EMBODIMENTS

The present invention will be described in detail below based on embodiments with reference to the accompanying drawings. Note that arrangements to be described in the following embodiments are merely examples, and the present invention is not limited to the illustrated arrangements.

First Embodiment

Figure 1:
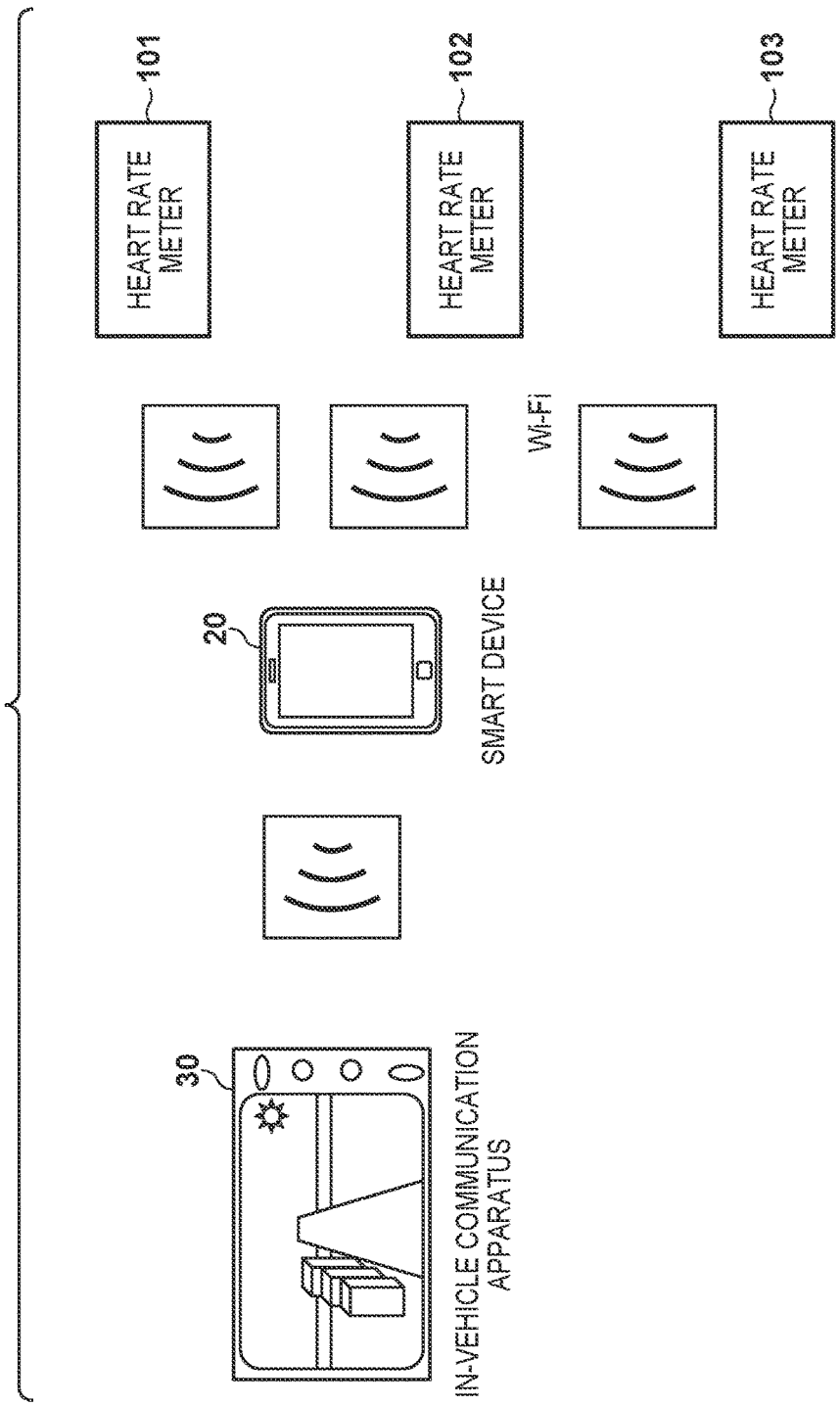
FIG. 1 is a schematic view showing the configuration of an assumed communication system according to an embodiment.

FIG. 1 is a schematic view showing the configuration of a communication system according to the first embodiment. The system according to this embodiment is formed from heart rate meters 101 to 103 as sensing apparatuses, a smart device 20 as a communication apparatus, and an in-vehicle communication apparatus 30 (IVI (In-Vehicle Infotainment)) as an information processing apparatus. In this embodiment, each of the heart rate meters 101 to 103 is a service providing apparatus (for providing heart rate information), and the in-vehicle communication apparatus 30 is a service using apparatus. These apparatuses are examples, and are not limited to such roles. This embodiment assumes that there exist a plurality of heart rate meters. However, one heart rate meter may exist. Each of the heart rate meters 101 to 103, the smart device 20, and the in-vehicle communication apparatus 30 includes a wireless communication interface complying with the BLE (Bluetooth Low Energy) standard. Note that each of the heart rate meters 101 to 103, the smart device 20, and the in-vehicle communication apparatus 30 is an example of a BLE communication device. Therefore, this embodiment can be equally implemented as long as a device capable of performing BLE communication, such as smart glasses, a temperature sensor, or a personal computer, is adopted. Note that the communication standard need not be limited to the BLE standard. As long as a standard for implementing intermittent communication, such as the IEEE802.11ah or IEEE802.15.4e standard, is adopted, this embodiment can be equally implemented.

Figure 2:
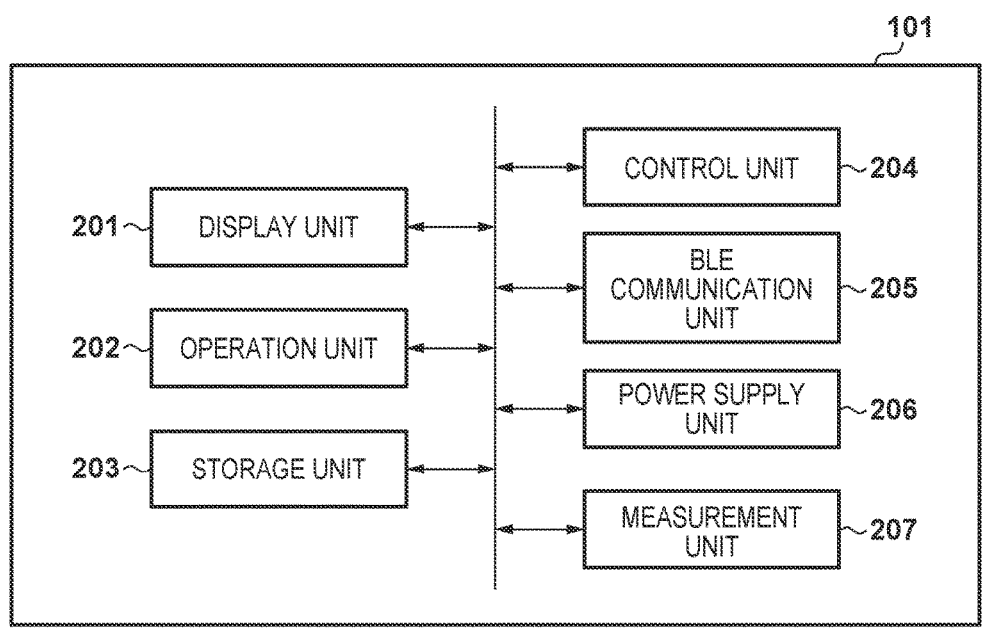
FIG. 2 is a schematic block diagram showing the hardware arrangement of a heart rate meter 101.

The hardware arrangements of the heart rate meters 101 to 103, the smart device 20, and the in-vehicle communication apparatus 30 will be described. FIG. 2 is a schematic block diagram showing the hardware arrangement of the heart rate meter 101. Note that each of the heart rate meters 102 and 103 has the same arrangement as that of the heart rate meter 101. The heart rate meter 101 includes a display unit 201, an operation unit 202, a storage unit 203, a control unit 204, a BLE communication unit 205, a power supply unit 206, and a measurement unit 207.

The display unit 201 is formed by, for example, an LCD (Liquid Crystal Display), has a function of outputting visually recognizable information, and displays a UI (User Interface), time, an image, a current heart rate value, and the like. The operation unit 202 has a function of operating the heart rate meter 101 by performing various input operations and the like. The storage unit 203 is formed by, for example, a volatile memory or a nonvolatile memory medium such as an SD card, stores the settings and past heart rate value of the heart rate meter 101 and a control program, and is used as a work memory or to temporarily store data when executing a program. The control unit 204 is formed by one or a plurality of CPUs (Central Processing Units), and controls the overall operation of the heart rate meter 101. The BLE communication unit 205 serves as a power-saving wireless communication unit for performing BLE communication. For example, the BLE communication unit 205 is used to transfer data (for example, a heart rate value) measured by the measurement unit 207, and control data such as control information. The power supply unit 206 holds a power supply (a battery or the like) for operating the overall apparatus, and supplies power to each hardware component. The measurement unit 207 measures the heart rate of a user wearing/holding the heart rate meter 101.

The hardware arrangement of the smart device 20 will be described with reference to FIG. 3. FIG. 3 is a schematic block diagram showing the hardware arrangement of the smart device 20. The smart device 20 includes a display unit 301, an operation unit 302, a storage unit 303, a control unit 304, a BLE communication unit 305, and a power supply unit 306.

The display unit 301 is formed by, for example, an LCD, has a function of outputting visually recognizable information, and displays a UI, application information, and the like. The operation unit 302 has a function of operating the smart device 20 by performing various input operations and the like. The storage unit 303 is formed by, for example, a volatile memory or a nonvolatile memory medium such as an SD card, stores setting information and a control program, and is used as a work memory or to temporarily store data when executing a program. The control unit 304 is formed by one or a plurality of CPUs (Central Processing Units), and controls the overall operation of the smart device 20. The BLE communication unit 305 serves as a power-saving wireless communication unit for performing BLE communication. For example, the BLE communication unit 305 is used to communicate control information with the in-vehicle communication apparatus 30 and the heart rate meters 101 to 103 as adjacent information transmission apparatuses. The power supply unit 306 holds a power supply (a battery or the like) for operating the overall apparatus, and supplies power to each hardware component.

The hardware arrangement of the in-vehicle communication apparatus 30 will be described with reference to FIG. 4. FIG. 4 is a schematic block diagram showing the hardware arrangement of the in-vehicle communication apparatus 30. The in-vehicle communication apparatus 30 includes a display unit 401, an operation unit 402, a storage unit 403, a control unit 404, a BLE communication unit 405, and a power supply unit 406.

The display unit 401 is formed by, for example, an LCD, has a function of outputting visually recognizable information, and displays a UI, a map, travel information, and the like. The operation unit 402 has a function of operating the in-vehicle communication apparatus 30 by performing various input operations and the like. The storage unit 403 is formed by, for example, a volatile memory or a nonvolatile memory medium such as an SD card, stores setting information, map information, and a control program, and is used as a work memory or to temporarily store data when executing a program. The control unit 404 is formed by one or a plurality of CPUs (Central Processing Units), and controls the overall operation of the in-vehicle communication apparatus 30. The BLE communication unit 405 serves as a power-saving wireless communication unit for performing BLE communication. For example, the BLE communication unit 405 is used to communicate control information with the smart device 20 as an adjacent information transmission apparatus. The power supply unit 406 holds a power supply (a battery or the like) for operating the overall apparatus, and supplies power to each hardware component.

Figure 6:
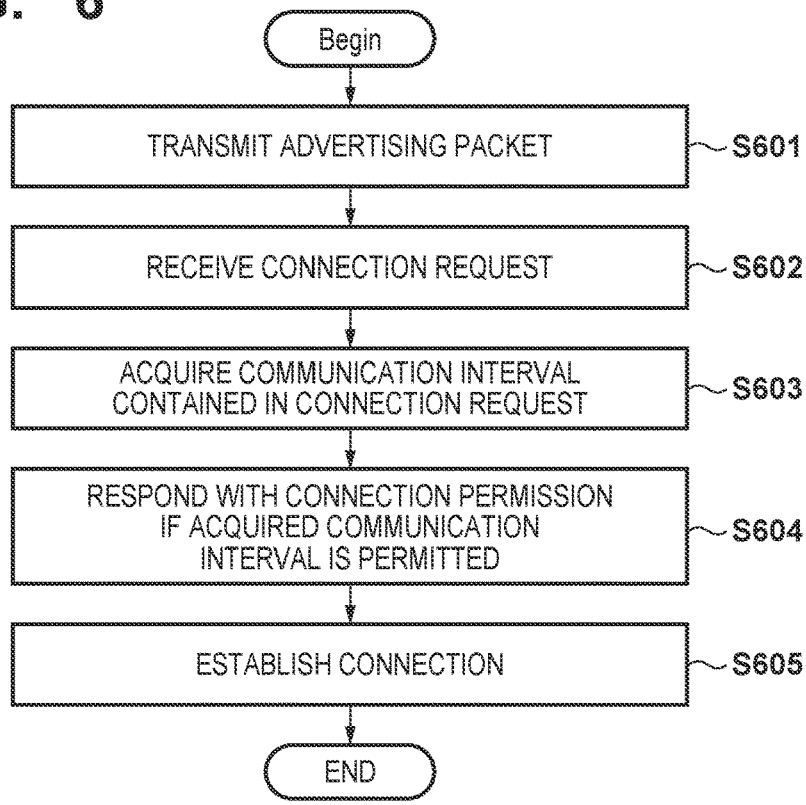
FIG. 6 is a flowchart illustrating BLE connection processing to the in-vehicle communication apparatus 30 by the smart device 20.
Figure 7:
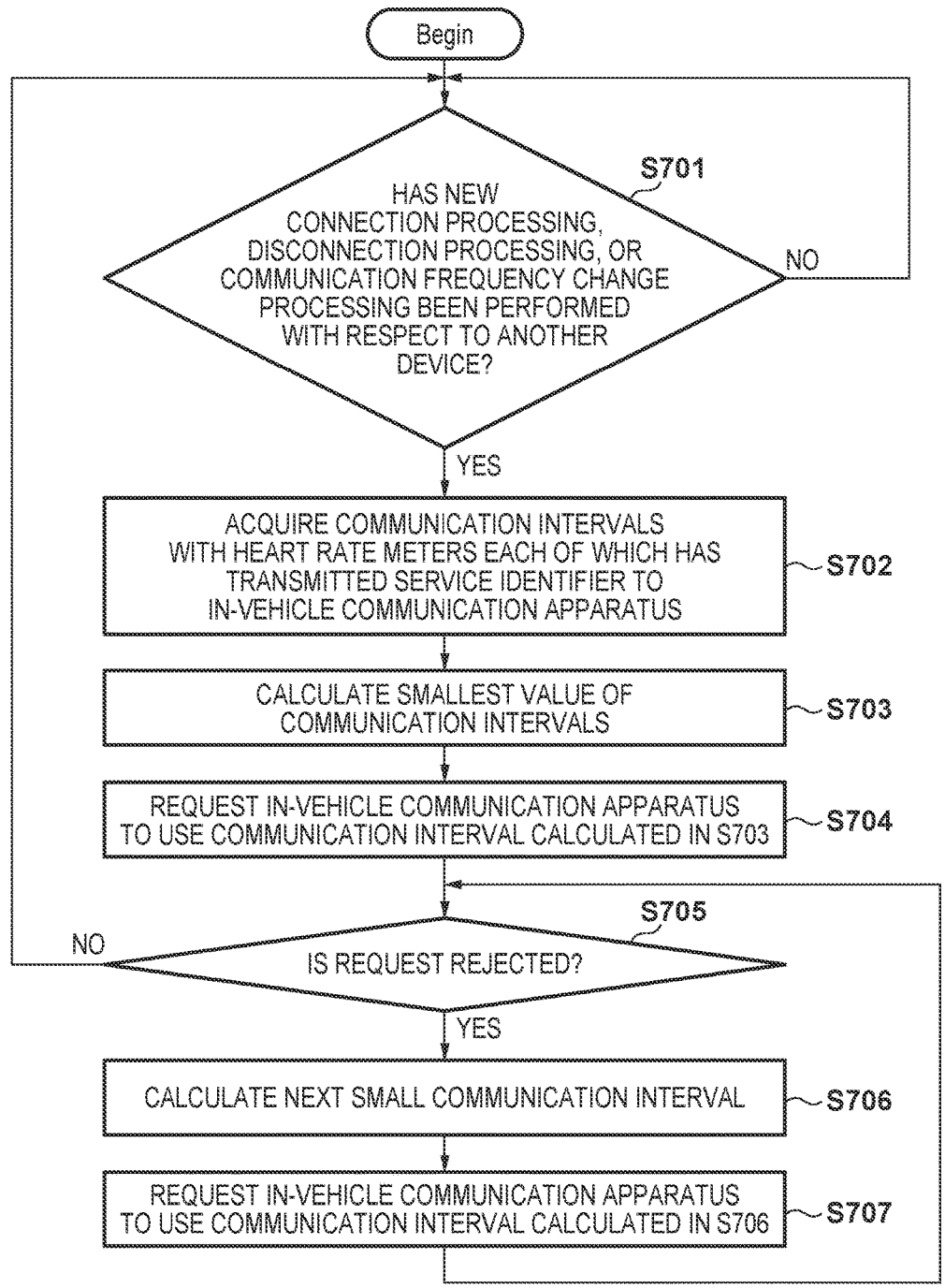
FIG. 7 is a flowchart illustrating communication frequency change processing by the smart device 20 according to the first embodiment.

The operation of the communication system according to this embodiment will be described with reference to FIGS. 5 to 8. BLE connection processing to the heart rate meters 101 to 103 by the smart device 20, BLE connection processing to the in-vehicle communication apparatus 30 by the smart device 20, and communication frequency change processing by the smart device 20 will be described with reference to FIGS. 5 to 7. After that, the communication control sequence of the communication system according to this embodiment will be described with reference to FIG. 8. When the control unit of the smart device 20 executes a program stored in the storage unit, each step in FIGS. 5 to 7 is executed.

Figure 5:
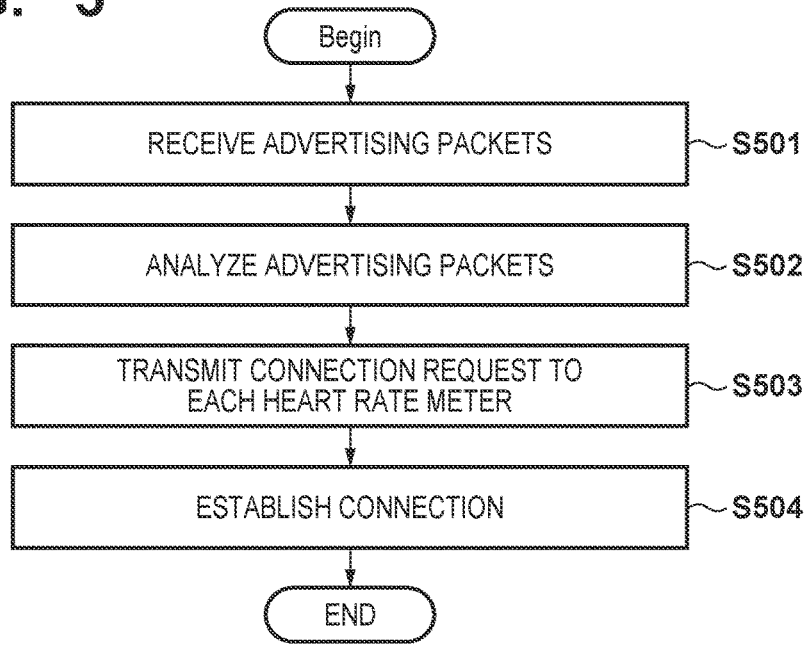
FIG. 5 is a flowchart illustrating BLE connection processing to the heart rate meters 101 to 103 by the smart device 20.

FIG. 5 is a flowchart illustrating the BLE connection processing to the heart rate meters 101 to 103 by the smart device 20. First, the smart device 20 receives advertising packets indicating pieces of information of the heart rate meters 101 to 103 from the heart rate meters 101 to 103, respectively (step S501). Each of the heart rate meters 101 to 103 serves as a BLE peripheral device, the smart device 20 serves as a BLE central device, and a piconet is created between the heart rate meters 101 to 103 and the smart device 20.

The smart device 20 analyzes contents of the received advertising packets (step S502). Each advertising packet can store, for example, the device name of an apparatus (that is, a corresponding one of the heart rate meters 101 to 103), a flag indicating whether the apparatus supports Bluetooth version 4.0, information for identifying a service supported by the apparatus, and the like. Supporting Bluetooth version 4.0 indicates supporting BLE. The information for identifying a service is, for example, a UUID (Universally Unique IDentifier), and will be referred to as a service identifier hereinafter. This embodiment assumes that each of the heart rate meters 101 to 103 can provide a service (to be referred to as Heart Rate Service hereinafter) for providing heart rate information such as a heart rate value. Thus, for example, 0x180D as a value indicating Heart Rate Service is used as the service identifier. This allows the smart device 20 that has received the advertising packets to know that the heart rate meters 101 to 103 as advertising packet transmission sources each can provide Heart Rate Service (the heart rate meters 101 to 103 each hold heart rate information).

The smart device 20 that knows the existence of the heart rate meters 101 to 103 transmits a connection request (BLE CONNECT_REQ) to each of the heart rate meters 101 to 103 to obtain the heart rate information (step S503). The connection request contains, for example, a communication interval (BLE connInterval) corresponding to a communication frequency to be used after connection. The communication frequency can be determined depending on the characteristic of data to be communicated and the performance of the communicating apparatus. For example, it is not so important to communicate, every 10 msec, data that is updated every second. For example, if, with the performance of the communicating apparatus, it is impossible to perform communication every 10 msec or less, a communication interval longer than 10 msec needs to be used. The smart device 20 can determine a communication interval based on such condition, and contain it in the connection request. The smart device 20 stores, in the storage unit 303, information of the communication interval with respect to each of the heart rate meters 101 to 103. After transmitting the connection request in step S504, the smart device 20 establishes a BLE connection to each of the heart rate meters 101 to 103 (step S504), thereby performing BLE communication.

FIG. 6 is a flowchart illustrating the BLE connection processing to the in-vehicle communication apparatus 30 by the smart device 20. First, the smart device 20 transmits an advertising packet indicating information of the smart device 20 to a nearby device (step S601). The smart device 20 serves as a BLE peripheral device, the in-vehicle communication apparatus 30 serves as a BLE central device, and a piconet is created between the smart device 20 and the in-vehicle communication apparatus 30.

The advertising packet transmitted in step S601 contains contents (the service identifies of the heart rate meters 101 to 103 and the like) of the advertising packets received from the heart rate meters 101 to 103. However, the contents contained in the advertising packet are not all but some of the contents of the advertising packets received from the heart rate meters 101 to 103 in accordance with the condition. For example, if the data size of the advertising packet is limited, some of the contents can be excluded, or the information of the heart rate meter which has been determined to be unnecessary for the in-vehicle communication apparatus 30 can be excluded.

After transmitting the advertising packet, the smart device 20 receives a connection request transmitted by the in-vehicle communication apparatus 30 to acquire the heart rate information (step S602). The smart device 20 acquires a communication interval (BLE connInterval) contained in the received connection request (step S603). If the acquired communication interval is permitted, the smart device 20 responds with connection permission (step S604). Then, the smart device 20 establishes a BLE connection to the in-vehicle communication apparatus 30 (step S605), thereby performing BLE communication.

FIG. 7 is a flowchart illustrating the communication frequency change processing of this embodiment by the smart device 20. First, the smart device 20 determines whether new connection processing, disconnection processing, or communication frequency change processing has been performed with respect to another device (step S701). For example, the smart device 20 determines whether connection to the in-vehicle communication apparatus 30 has started or whether the connection to each of the connected heart rate meters 101 to 103 has been disconnected. If NO is determined in step S701, the smart device 20 continuously performs the determination processing in step S701. Note that in step S701, it may be determined whether not all but some of the new connection processing, disconnection processing, and communication frequency change processing have been performed with respect to another device. In step S701, the smart device 20 may perform the determination processing with respect to only the central device or peripheral device when viewed from the smart device 20, that is, only the central device or peripheral device connected to the same piconet as that of the smart device 20.

If YES is determined in step S701, the smart device 20 acquires, from the storage unit 303, communication intervals with the heart rate meters each of which has transmitted the service identifier to the in-vehicle communication apparatus 30, among the heart rate meters 101 to 103 (step S702). That is, the smart device 20 acquires, from the storage unit 303, the communication intervals of the heart rate meters corresponding to the service identifier contained in the advertising packet transmitted by the smart device 20 in step S601 of FIG. 6. Note that the communication intervals of communications of all the devices with which the smart device 20 performs communication by serving as a central device may be acquired from the storage unit 303 without imposing any limitation by the service identifier.

Subsequently, the smart device 20 calculates (determines) the smallest value of the acquired communication intervals (step S703). If one communication interval is acquired in step S702, this step may be omitted. Then, the smart device 20 requests the in-vehicle communication apparatus 30 to use the communication interval calculated in step S703 (step S704). If step S703 is omitted, the smart device 20 requests the in-vehicle communication apparatus 30 to use the communication interval acquired in step S702. If the in-vehicle communication apparatus 30 does not reject the request (NO in step S705), the process returns to step S701; otherwise (YES in step S705), the smart device 20 calculates the communication interval of the value small next to the communication interval calculated in step S703 (step S706). The smart device 20 requests the in-vehicle communication apparatus 30 to use the calculated communication interval (step S707). After that, the process returns to step S705, and it is determined whether the request is rejected (step S705). Note that if YES is determined in step S705, when there is no communication interval as a next candidate, the process in FIG. 7 ends.

Figure 8:
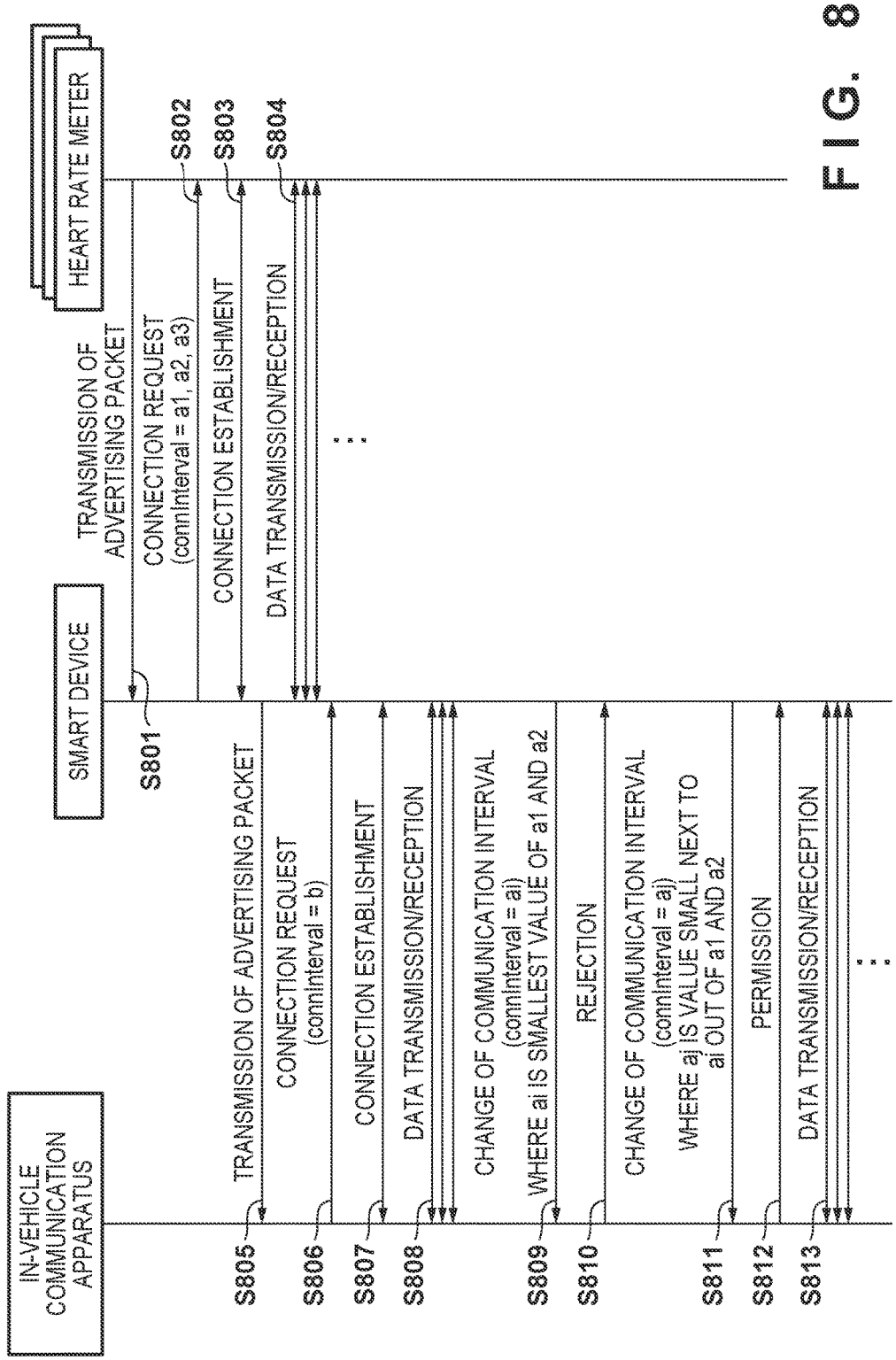
FIG. 8 is a sequence chart showing the communication control sequence of a communication system according to the first and second embodiments.

The operation of the communication system according to this embodiment will be described using FIG. 8 with reference to FIGS. 5 to 7. FIG. 8 shows the communication control sequence of the communication system according to this embodiment.

In S801, each of the heart rate meters 101 to 103 transmits an advertising packet indicating information of itself to a nearby device. The smart device 20 receives the advertising packet (step S501), and analyzes its contents (step S502). As described above, for example, this advertising packet stores a value of 0x180D indicating Heart Rate Service as the service identifier of the service supported by each of the heart rate meters 101 to 103.

In S802, the smart device 20 transmits a connection request (BLE CONNECT_REQ) to each of the heart rate meters 101 to 103 to obtain the heart rate information (step S503). In the example of FIG. 8, the smart device 20 transmits connection requests containing communication intervals a1, a2, and a3 to the heart rate meters 101 to 103, respectively. The smart device 20 stores the communication intervals a1, a2, and a3 in the storage unit 303. In this embodiment, the smart device 20 automatically transmits a connection request to a device having heart rate information (the service identifier of Heart Rate Service). However, the transmission destination of a connection request may be determined based on a device name. Alternatively, the smart device 20 may transmit a connection request to a device determined by the user. The user can determine the transmission destination of a connection request based on each device name, supported service information, and the like. If the user determines the transmission destination of a connection request based on a device name, it is possible to perform connection without communicating supported service information. In this case, in the example of FIG. 8, each of the heart rate meters 101 to 103 can perform the same processing as in this embodiment without storing the service identifier in the advertising packet.

Next, in S803, a BLE connection is established between the smart device 20 and each of the heart rate meters 101 to 103 (step S504), and data transmission/reception by BLE is performed in S804. Upon establishment of the BLE connections in S803, the smart device 20 transmits, in S805, the advertising packet indicating information of itself to a nearby device (step S601). The smart device 20 serves as a central device with respect to the heart rate meters 101 to 103 serving as peripheral devices, and serves as a peripheral device with respect to the in-vehicle communication apparatus 30 serving as a central device.

The in-vehicle communication apparatus 30 receives the advertising packet from the smart device 20 and analyzes its contents. In the example of FIG. 8, the advertising packet contains some of the contents of the advertising packets received from the heart rate meters 101 to 103. More specifically, the advertising packet contains the service identifiers of the heart rate meters 101 and 102 corresponding to the communication intervals a1 and a2 but does not contain the service identifier of the heart rate meter 103 corresponding to the communication interval a3. Note that in the example of FIG. 8, after S803, the advertising packet is transmitted. However, even if there are no connections to the heart rate meters 101 to 103, the smart device 20 may already, continuously transmit the advertising packet to send a notification of the service of itself.

In S806, the in-vehicle communication apparatus 30 that knows the existence of the smart device 20 transmits a connection request to the smart device 20 to obtain the heart rate information. Contents of the connection request contain a communication interval (connInterval) corresponding to a communication frequency to be used after connection. In the example of FIG. 8, the in-vehicle communication apparatus 30 transmits the connection request with the communication interval b to the smart device 20. In this embodiment, the in-vehicle communication apparatus 30 automatically transmits a connection request to a device having heart rate information (the service identifier of Heart Rate Service). However, the transmission destination of a connection request may be determined based on a device name. The in-vehicle communication apparatus 30 may transmit a connection request to a device determined by the user. The user can determine the transmission destination of a connection request based on each device name, supported service information, and the like. If the user determines the transmission destination of a connection request based on a device name, it is possible to perform connection without communicating supported service information. In this case, in the example of FIG. 8, the smart device 20 can perform the same processing as in this embodiment without storing the service identifier in the advertising packet.

In S807, if the acquired communication interval b is permitted, the smart device 20 responds with connection permission (step S604). Then, a BLE connection between the smart device 20 and the in-vehicle communication apparatus 30 is established (step S605), and data transmission/reception by BLE is performed in S808. Note that S808 may be omitted depending on the timing of S809 (to be described later).

In the example of FIG. 8, the sequence in which the smart device 20 performs BLE connection to the heart rate meters 101 to 103 and then performs BLE connection to the in-vehicle communication apparatus 30 has been described. The order may be reversed. That is, the smart device 20 may perform BLE connection to the in-vehicle communication apparatus 30, and then perform BLE connection to the heart rate meters 101 to 103.

Before advancing to S809, the smart device 20 determines whether new connection processing, disconnection processing, or communication frequency change processing has been performed with respect to another device (step S701). For example, the smart device 20 determines whether connection to the in-vehicle communication apparatus 30 has started or whether the connection to each of the connected heart rate meters 101 to 103 has been disconnected. In the example of FIG. 8, since the smart device 20 has established the BLE connection to the in-vehicle communication apparatus 30, the process advances to a next communication frequency acquisition step (step S702). In the example of FIG. 8, as described in S805, the service identifiers of the heart rate meters 101 and 102 corresponding to the communication intervals a1 and a2 have been transmitted to the in-vehicle communication apparatus 30. Therefore, the smart device 20 acquires the communication intervals a1 and a2 from the storage unit 303. Subsequently, the smart device 20 calculates a communication interval ai of a smallest value out of the communication intervals a1 and a2.

In S809, the smart device 20 transmits, to the in-vehicle communication apparatus 30, a request to use the calculated communication interval ai (change to the communication interval ai). As the request, for example, a BLE LL_CONNECTION_PARAM_REQ message is used. If the smart device 20 knows in advance that the communication interval b requested in S806 is equal to the calculated communication interval ai, processing after the change request transmission processing (S809) may be omitted.

In the example of FIG. 8, the in-vehicle communication apparatus 30 rejects the request transmitted in S809 because, in the communication method of the in-vehicle communication apparatus 30, communication at the communication interval ai is impossible in terms of the performance or is not recommended (S810). In this case, in S811, the smart device 20 calculates a communication interval aj small next to the communication interval ai out of the communication intervals a1 and a2 (step S706), and transmits, to the in-vehicle communication apparatus 30, a request to use the calculated communication interval aj (change to the communication interval aj) (step S707).

Next, in the example of FIG. 8, in S812, the in-vehicle communication apparatus 30 permits the request transmitted in S811 (NO in step S705). Subsequently, in S811, the in-vehicle communication apparatus 30 and the smart device 20 change the communication interval to the communication interval aj requested in S811, and data transmission/reception is performed at the changed communication interval in S813. After that, if the smart device 20 determines that new connection processing, disconnection processing, or communication frequency change processing has been performed with respect to another device (YES in step S701), the process advances to the communication frequency acquisition step (step S702).

Note that if all the requests to change to the communication intervals a1, a2, and a3 are rejected, communication between the in-vehicle communication apparatus 30 and the smart device 20 is continued at the communication interval b. In this situation, the timing of transmitting information to the in-vehicle communication apparatus 30 comes in a state in which the communication interval b is shorter than, for example, the communication interval a1, and the heart rate information from the heart rate meter 101 corresponding to the communication interval a1 is not updated. At this time, with the information of the heart rate meter 101 corresponding to the communication interval a1, the heart rate information transmitted last from the smart device 20 to the in-vehicle communication apparatus 30 is transmitted to the in-vehicle communication apparatus 30. More specifically, consider a case in which assuming that the communication interval b is 100 msec and the communication interval a1 is 200 msec, the smart device 20 sequentially receives heart rates of 60, 61, and 62 from the heart rate meters 101 to 103, respectively, at an interval of 200 msec. Upon receiving the heart rates, the smart device 20 sequentially transmits the heart rates of 60, 60, 61, 61, 62, and 62 to the in-vehicle communication apparatus 30 at an interval of 100 msec.

In this embodiment, as described above, the communication interval between the in-vehicle communication apparatus 30 and the smart device 20 is changed. This makes it possible to obtain an effect of allowing the in-vehicle communication apparatus 30 to perform efficient communication so as to minimize the communication count while following update of all the pieces of information of the heart rate meters 101 to 103 without missing it.

In this embodiment, the communication interval between the in-vehicle communication apparatus 30 and the smart device 20 is changed to the smallest value of the communication intervals of the heart rate meters, whose service identifiers have been shown by the smart device 20 to the in-vehicle communication apparatus 30, among the heart rate meters 101 to 103. By excluding communication irrelevant to the in-vehicle communication apparatus 30 from consideration at the time of changing the communication frequency, it is possible to change the communication count to the minimum one, thereby obtaining an effect of allowing effective communication.

In this embodiment, if the in-vehicle communication apparatus 30 rejects the change to the communication interval of the smallest value, the smart device 20 transmits a request to change to a value large next to the smallest value. This obtains an effect of allowing efficient communication in which update of pieces of information of the heart rate meters as many as possible is followed without missing it.

In this embodiment, if connection processing, disconnection processing, or communication frequency change processing is performed between the smart device 20 and another device, a communication frequency change request to change to the smallest value is transmitted. This obtains an effect of appropriately allowing effective communication even if the configuration of the communication system dynamically changes.

In this embodiment, the communication interval has been exemplified as a communication frequency. For example, even if a communication negligible count (BLE connSlave-Latency) is used instead of the communication interval, the same effect can be obtained. For example, if the communication negligible count between the in-vehicle communication apparatus 30 and the smart device 20 is two and the communication interval is 100 msec, the smart device 20 can substantially set the communication interval to 200 msec by omitting a communication operation every other time. When communication negligible counts or values each obtained by multiplying the communication interval by the communication negligible count are made to match between two piconets, the same effect can be produced in this embodiment.

Second Embodiment

In the first embodiment, the smart device 20 changes the communication frequency by limiting consideration to the heart rate meter that has transmitted the service identifier to the in-vehicle communication apparatus 30. This embodiment will describe a mode in which a smart device 20 changes a communication frequency by limiting consideration to a heart rate meter that has transmitted service information to an in-vehicle communication apparatus 30. Note that the service information is information for providing a service by a heart rate meter, and is, for example, heart rate information. The difference from the above embodiment will be described below. The configuration of a communication system, the arrangement of each of heart rate meters 101 to 103, the arrangement of the smart device 20, and the arrangement of the in-vehicle communication apparatus 30 are as described with reference to FIGS. 1 to 4 in the first embodiment.

Subsequently, the operation of the communication system according to this embodiment will be described with reference to FIGS. 5, 6, 8, and 9. FIGS. 5 and 6 are a flowchart illustrating BLE connection processing to the heart rate meters 101 to 103 by the smart device 20 and a flowchart illustrating BLE connection processing to the in-vehicle communication apparatus 30 by the smart device 20, both of which have been described in the first embodiment. On the other hand, communication frequency change processing according to this embodiment is different from the first embodiment, and will be described with reference to FIG. 9. After that, the communication control sequence of the communication system according to this embodiment will be described with reference to FIG. 8.

Figure 9:
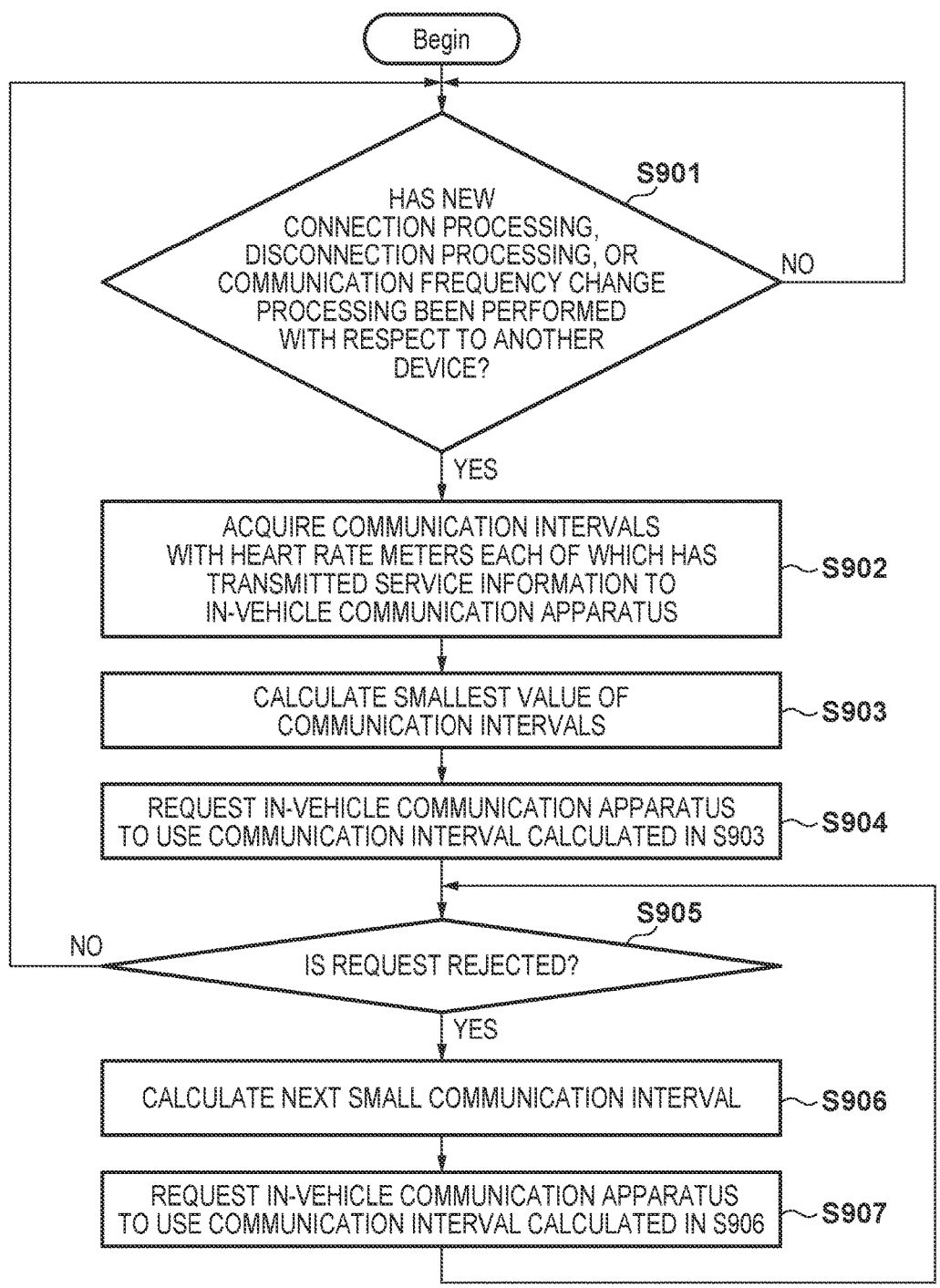
FIG. 9 is a flowchart illustrating communication frequency change processing by a smart device 20 according to the second embodiment.

FIG. 9 is a flowchart illustrating the communication frequency change processing of this embodiment by the smart device 20. As compared to FIG. 7 described in the first embodiment, processes in steps S901 and S904 to S907 are the same as those in steps S701 and S704 to S707 but processes in steps S902 and S903 are different. In step S902, the smart device 20 acquires, from a storage unit 303, communication intervals with the heart rate meters each of which has transmitted service information to the in-vehicle communication apparatus 30, among the heart rate meters 101 to 103. Subsequently, the smart device 20 calculates the smallest value of the acquired communication intervals (step S703).

The operation of the communication system according to this embodiment will be described using FIG. 8 with reference to FIGS. 5, 6, and 9. FIG. 8 shows the communication control sequence of the communication system according to this embodiment.

Processes in S801 to S807 are the same as in the first embodiment and a description thereof will be omitted. In S808, data transmission/reception by BLE is performed between the in-vehicle communication apparatus 30 and the smart device 20. During the data transmission/reception, in this embodiment, the in-vehicle communication apparatus 30 acquires pieces of heart rate information of the two heart rate meters 101 and 102 among the heart rate meters 101 to 103 via the smart device 20. Among the heart rate meters 101 to 103, the heart rate meters from each of which the heart rate information is acquired are selected based on, for example, device names. This selection processing may be performed based on additional information of performance and the like. For example, it can be considered that the in-vehicle communication apparatus 30 selects only the high-performance heart rate meter, and does not acquire the heart rate information from the low-performance heart rate meter. The selection processing may be performed by the smart device 20.

Before advancing to S809, the smart device 20 determines whether new connection processing, disconnection processing, or communication frequency change processing has been performed with respect to another device (step S901). For example, the smart device 20 determines whether connection to the in-vehicle communication apparatus 30 has started or whether a connection to each of the connected heart rate meters 101 to 103 has been disconnected. In the example of FIG. 8, since the smart device 20 has established a BLE connection to the in-vehicle communication apparatus 30, the process advances to a communication frequency acquisition step (step S902).

In the communication frequency acquisition step, communication intervals a1 and a2 of the heart rate meters 101 and 102, each of which has transmitted the service information to the in-vehicle communication apparatus 30, among the heart rate meters 101 to 103 are acquired from the storage unit 303. Processes in S809 to S813 are the same as in the first embodiment and a description thereof will be omitted.

In this embodiment, as described above, the smart device 20 changes the communication interval between the in-vehicle communication apparatus 30 and the smart device 20 to the smallest value of the communication intervals of the heart rate meters each of which has transmitted the service information to the in-vehicle communication apparatus 30. This can change the communication count to the minimum one by excluding the heart rate meter unnecessary for the in-vehicle communication apparatus 30 from consideration at the time of changing the communication frequency, thereby obtaining an effect of allowing effective communication. In this embodiment, the communication interval has been exemplified as the communication frequency. However, as described in the first embodiment, even if a communication negligible count or the like is used instead of the communication interval, the same effect can be obtained.

Third Embodiment

The first embodiment has explained the mode in which the smart device 20 changes the communication frequency with the in-vehicle communication apparatus 30 based on the communication frequency with the heart rate meter. This embodiment will describe a mode in which a smart device 20 changes a communication frequency with a heart rate meter based on a communication frequency with an in-vehicle communication apparatus 30. The difference from the above embodiment will be described below. The configuration of a communication system, the arrangement of each of heart rate meters 101 to 103, the arrangement of the smart device 20, and the arrangement of the in-vehicle communication apparatus 30 is as described with reference to FIGS. 1 to 4 in the first embodiment.

The operation of the communication system according to this embodiment will be described with reference to FIGS. 5, 6, 10, and 11. FIGS. 5 and 6 are a flowchart illustrating BLE connection processing to the heart rate meters 101 to 103 by the smart device 20 and a flowchart illustrating BLE connection processing to the in-vehicle communication apparatus 30 by the smart device 20, both of which have been described in the first embodiment. On the other hand, communication frequency change processing according to this embodiment is different from the first embodiment, and will be described with reference to FIG. 10. After that, the communication control sequence of the communication system according to this embodiment will be described with reference to FIG. 11.

Figure 10:
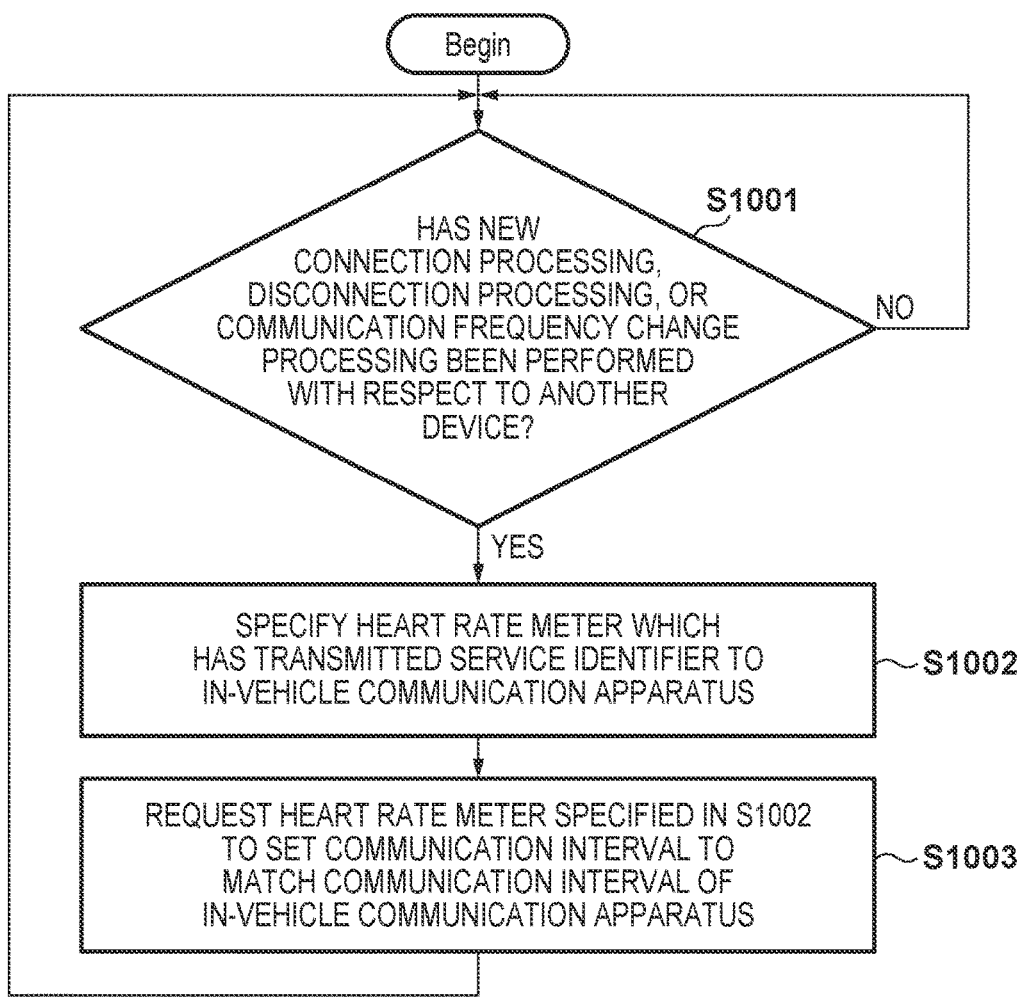
FIG. 10 is a flowchart illustrating communication frequency change processing by a smart device 20 according to the third embodiment.

FIG. 10 is a flowchart illustrating the communication frequency change processing of this embodiment by the smart device 20. As compared to FIG. 7 described in the first embodiment, processing in step S1001 is the same as that in step S701. In step S1002, the smart device 20 specifies, among the heart rate meters 101 to 103, the heart rate meter which has transmitted the service identifier to the in-vehicle communication apparatus 30. In step S1003, the smart device 20 transmits, to the heart rate meter specified in step S1002, a request to use a communication interval b (change to a communication interval b) between the in-vehicle communication apparatus 30 and the smart device 20. That is, the smart device 20 requests the heart rate meter specified in step S1002 to set its communication interval to match the communication interval b of the in-vehicle communication apparatus 30.

Note that in step S1003, without imposing any limitation by the service identifier, the smart device 20 may specify all the devices with which it performs communication by serving as a central device. A limitation may be imposed depending on whether the service information has been transmitted, as in the second embodiment, instead of imposing a limitation by the service identifier. In step S1001, it may be determined whether not all but some of the new connection processing, disconnection processing, and communication frequency change processing have been performed with respect to another device. In step S1001, the smart device 20 may perform the determination processing with respect to only the central device or peripheral device when viewed from the smart device 20.

Figure 11:
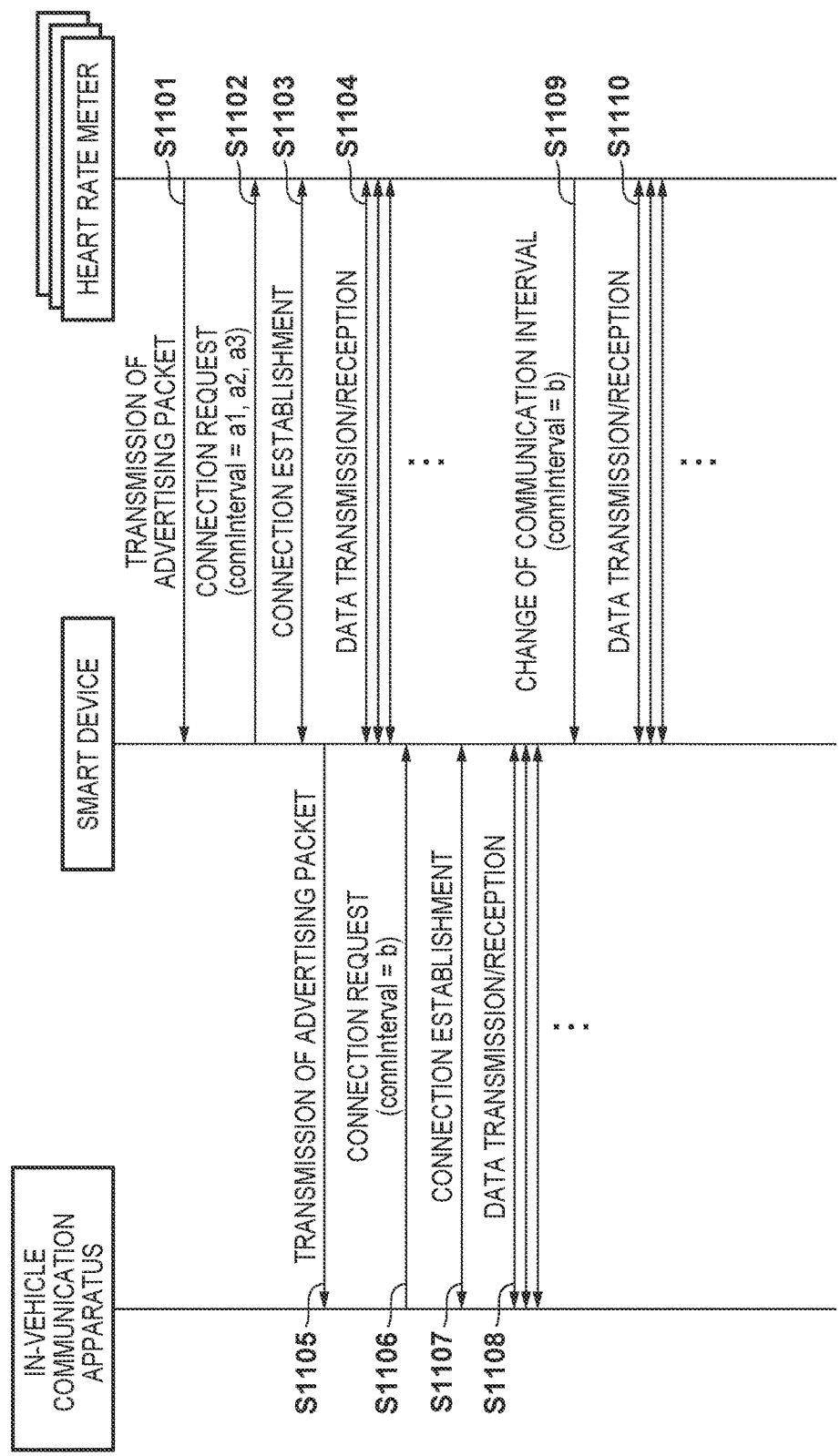
FIG. 11 is a sequence chart showing the communication control sequence of a communication system according to the third embodiment.

The operation of the communication system according to this embodiment will be described using FIG. 11 with reference to FIGS. 5, 6, and 10. FIG. 11 shows the communication control sequence of the communication system according to this embodiment. Processes in S1101 to S1108 are the same as those in S801 to S808 of FIG. 8 described in the first embodiment and a description thereof will be omitted.

Before advancing to S1109, the smart device 20 determines whether the new connection processing, disconnection processing, or communication frequency change processing has been performed with respect to another device (step S1001). For example, the smart device 20 determines whether connection to the in-vehicle communication apparatus 30 has started or whether a connection to each of the connected heart rate meters 101 to 103 has been disconnected. In the example of FIG. 11, since the smart device 20 has established a BLE connection to the in-vehicle communication apparatus 30, the process advances to a next heart rate specifying step (step S1002).

In the heart rate specifying step, the smart device 20 specifies, among the heart rate meters 101 to 103, the heart rate meter which has transmitted the service identifier to the in-vehicle communication apparatus 30. This embodiment assumes that the smart device 20 specifies that among the heart rate meters 101 to 103, the heart rate meters 101 and 102 have transmitted their service identifiers to the in-vehicle communication apparatus 30. In S1109, the smart device 20 transmits, to each of the heart rate meters 101 and 102 specified in the heart rate specifying step (step S1002) among the heart rate meters 101 to 103, a request to change to the communication interval b between the in-vehicle communication apparatus 30 and the smart device 20 (step S1003). As the request, a BLE LL_CONNECTION_PARAM_REQ message or LL_CONNECTION_UPDATE_REQ message is used.

In S1110, data transmission/reception is performed between the smart device 20 and each of the heart rate meters 101 and 102 at the communication frequency requested in S1109. After that, if the smart device 20 determines that new connection processing, disconnection processing, or communication frequency change processing has been performed with respect to another device (YES in step S1001), the process advances to the heart rate specifying step (step S1002).

In this embodiment, the communication interval between the smart device 20 and the heart rate meter specified among the heart rate meters 101 to 103 is changed to the communication interval between the in-vehicle communication apparatus 30 and the smart device 20. This obtains an effect of allowing efficient communication for the specified heart rate meter so as to minimize the communication count requested by the in-vehicle communication apparatus 30. In this embodiment, the communication interval has been exemplified as the communication frequency. As described in the first embodiment, even if a communication negligible count or the like is used instead of the communication interval, the same effect can be obtained.

Fourth Embodiment

The first embodiment has explained the mode in which if the communication frequency change request transmitted from the smart device 20 to the in-vehicle communication apparatus 30 is rejected, the smart device 20 retransmits a communication frequency change request to change to another value. This embodiment will describe a mode in which if a communication frequency change request transmitted from a smart device 20 to an in-vehicle communication apparatus 30 is rejected, the smart device 20 requests to change a communication frequency with a heart rate meter to a communication frequency with the in-vehicle communication apparatus 30. The difference from the above embodiment will be described below. The configuration of a communication system, the arrangement of each of heart rate meters 101 to 103, the arrangement of the smart device 20, and the arrangement of the in-vehicle communication apparatus 30 are as described with reference to FIGS. 1 to 4 in the first embodiment.

The operation of the communication system according to this embodiment will be described with reference to FIGS. 5, 6, 12, and 13. FIGS. 5 and 6 are a flowchart illustrating BLE connection processing to the heart rate meters 101 to 103 by the smart device 20 and a flowchart illustrating BLE connection processing to the in-vehicle communication apparatus 30 by the smart device 20, both of which have been described in the first embodiment. On the other hand, communication frequency change processing according to this embodiment is different from the first embodiment, and will be described with reference to FIG. 12. After that, the communication control sequence of the communication system according to this embodiment will be described with reference to FIG. 13.

Figure 12:
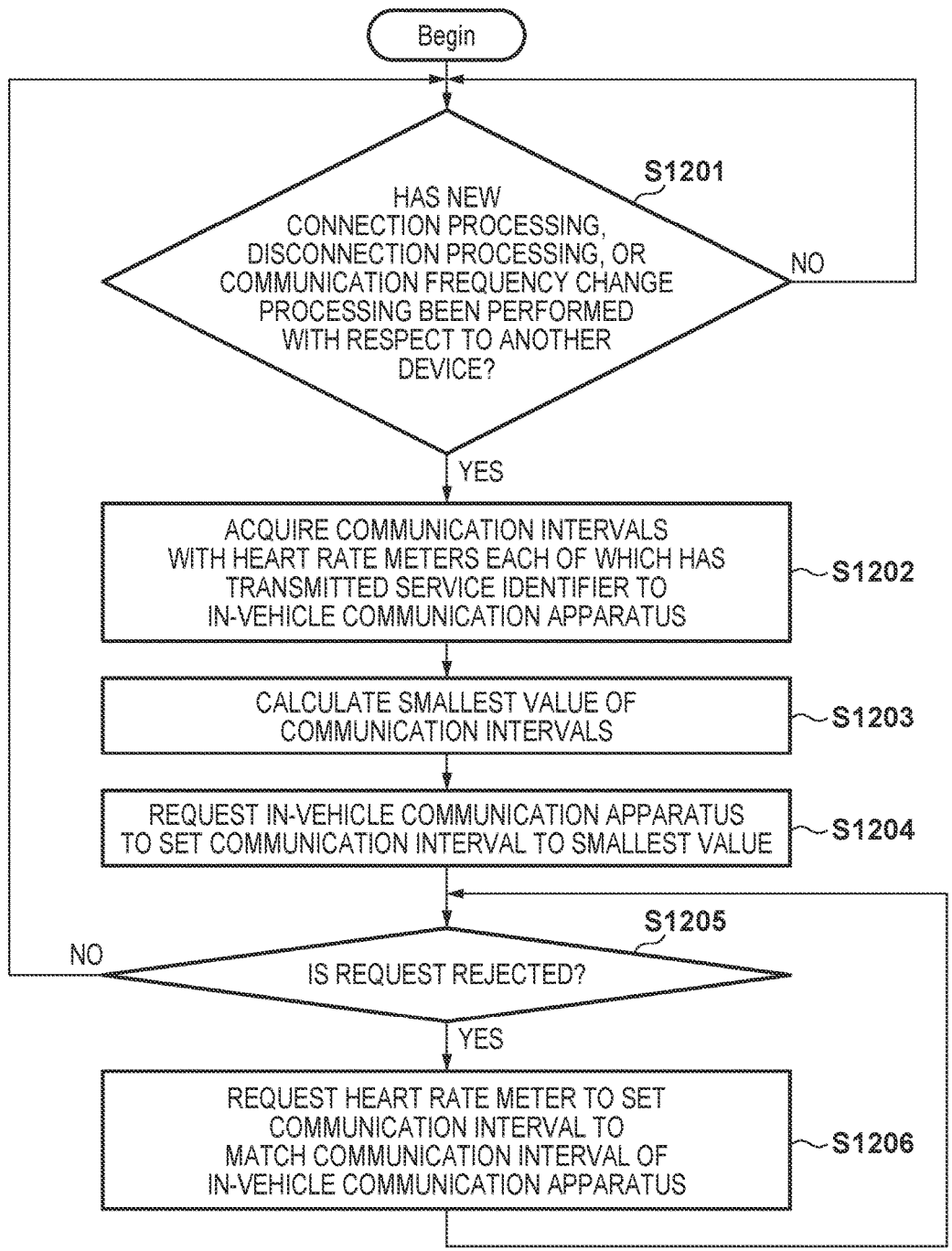
FIG. 12 is a flowchart illustrating communication frequency change processing by a smart device 20 according to the fourth embodiment.

FIG. 12 is a flowchart illustrating the communication frequency change processing of this embodiment by the smart device 20. As compared to FIG. 7 described in the first embodiment, processes in steps S1201 and S1204 are the same as those in steps S701 and S704 but processes in steps S1202, S1203, S1205, and S1206 are different. In step S1202, the smart device 20 acquires, from a storage unit 303, communication intervals with the heart rate meters each of which has transmitted a service identifier to the in-vehicle communication apparatus 30, among the heart rate meters 101 to 103. Subsequently, the smart device 20 calculates the smallest value of the acquired communication intervals (step S1203). The smart device 20 transmits, to the in-vehicle communication apparatus 30, a request to use the communication interval calculated in step S1203 (change to the calculated communication interval) (step S1204). If the in-vehicle communication apparatus 30 rejects the request (YES in step S1205), the smart device 20 transmits a request to use a communication interval b (change to the communication interval b) between the in-vehicle communication apparatus 30 and the smart device 20 (step S1206).

Note that in step S1203, without imposing any limitation by the service identifier, the smart device 20 may specify all devices with which it performs communication by serving as a central device. A limitation may be imposed depending on whether service information has been transmitted, as in the second embodiment, instead of imposing the limitation by the service identifier. In step S1201, it may be determined whether not all but some of the new connection processing, disconnection processing, and communication frequency change processing have been performed with respect to another device. In step S1201, the smart device 20 may perform the determination processing with respect to only the central device or peripheral device when viewed from the smart device 20.

Figure 13:
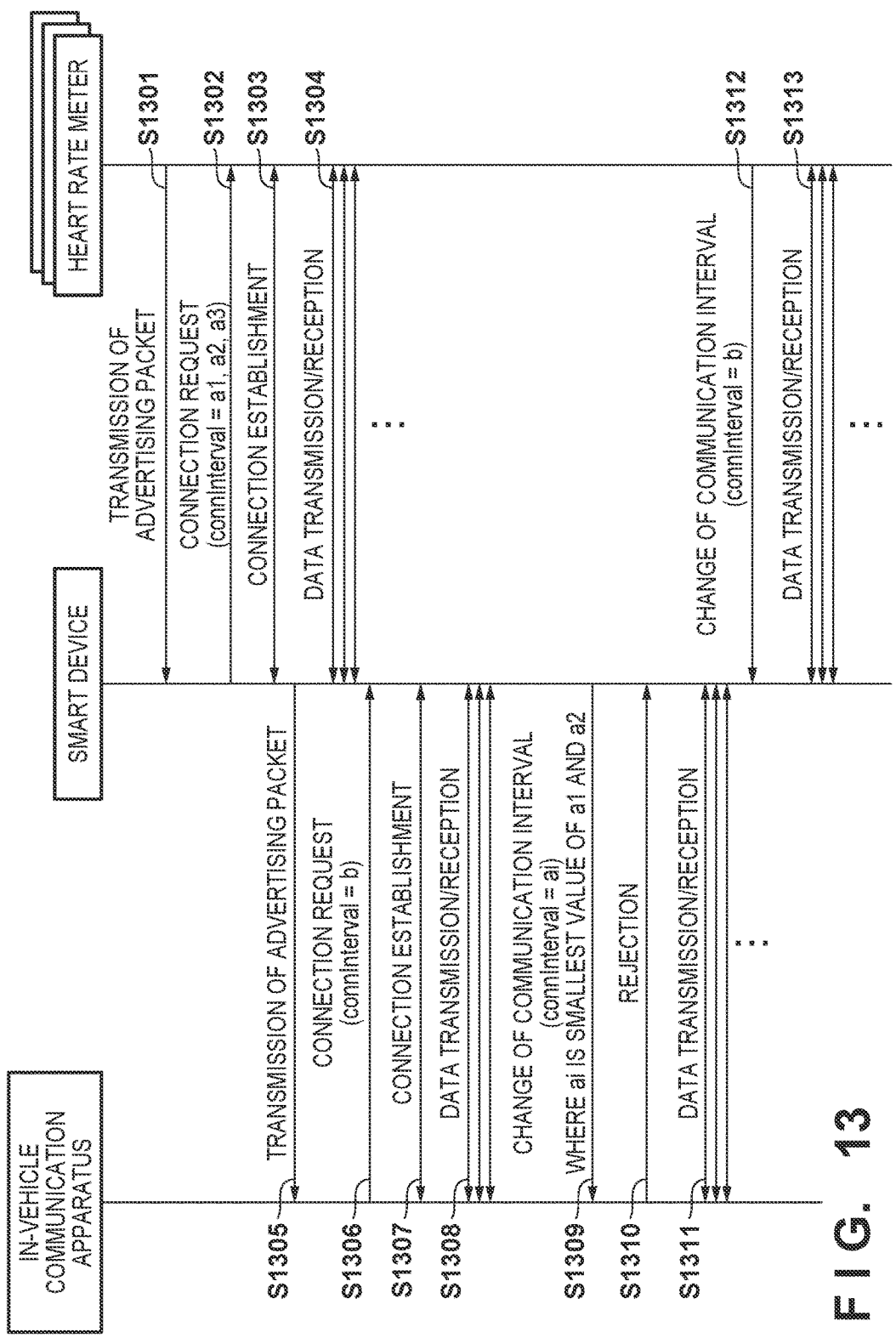
FIG. 13 is a sequence chart showing the communication control sequence of a communication system according to the fourth embodiment.

The operation of the communication system according to this embodiment will be described using FIG. 13 with reference to FIGS. 5, 6, and 12. FIG. 13 shows the communication control sequence of the communication system according to this embodiment. Processes in S1301 to S1308 are the same as those in S801 to S808 of FIG. 8 described in the first embodiment and a description thereof will be omitted.

Before advancing to S1309, the smart device 20 determines whether the new connection processing, disconnection processing, or communication frequency change processing has been performed with respect to another device (step S1201). For example, the smart device 20 determines whether connection to the in-vehicle communication apparatus 30 has started or whether a connection to each of the connected heart rate meters 101 to 103 has been disconnected. In the example of FIG. 13, since the smart device 20 has established a BLE connection to the in-vehicle communication apparatus 30, the process advances to a next communication frequency acquisition step (step S1202).

In the communication frequency acquisition step, the smart device 20 specifies, among the heart rate meters 101 to 103, the heart rate meter which has transmitted the service identifier to the in-vehicle communication apparatus 30, and acquires a communication interval between the smart device 20 and the specified heart rate meter from the storage unit 303. In the example of FIG. 13, the heart rate meters 101 and 102 corresponding to communication intervals a1 and a2 have transmitted the service identifiers to the in-vehicle communication apparatus 30. Thus, the smart device acquires the communication intervals a1 and a2 from the storage unit 303. Processes in S1309 and S1310 are the same as those in S809 and S810 of FIG. 8 described in the first embodiment and a description thereof will be omitted.

In S1311, the in-vehicle communication apparatus 30 and the smart device 20 continue data transmission/reception at the communication interval b. In S1312, the smart device 20 transmits, to the heart rate meters 101 and 102 specified in the communication frequency acquisition step (step S1202) among the heart rate meters 101 to 103, a request to use the communication interval b (change to the communication interval b) (step S1206). As the request, a BLE LL_CONNECTION_PARAM_REQ message or LL_CONNECTION_UPDATE_REQ message is used.

In S1313, the smart device 20 and each of the heart rate meters 101 and 102 perform data transmission/reception at the communication interval b as the requested communication interval. After that, if the smart device 20 determines that new connection processing, disconnection processing, or communication frequency change processing has been performed with respect to another device (YES in step S1201), the process advances to the communication frequency acquisition step (step S1202).

As described above, if the in-vehicle communication apparatus 30 rejects the frequency change to the smallest value, a request to change the communication frequency with each of the heart rate meters 101 to 103 to the communication frequency with the in-vehicle communication apparatus 30 is transmitted. Thus, even if the communication frequency with the in-vehicle communication apparatus 30 cannot be changed, it is possible to obtain an effect of improving the efficiency of indirect communication from each of the heart rate meters 101 to 103 to the in-vehicle communication apparatus 30 by changing the communication frequency with each of the heart rate meters 101 to 103.

According to the above-described embodiments, the communication interval between the in-vehicle communication apparatus 30 as an information processing apparatus and the smart device 20 as an intervening communication apparatus and that between the smart device 20 and each of the heart rate meters 101 to 103 as a service providing apparatus are optimized. This can process information by minimum communication while maintaining the real time property of information from the service providing apparatus, reducing the communication band and power consumption of the apparatuses.

Other Embodiments

The above-described embodiments can be appropriately combined. For example, in a smart device according to all the embodiments, the user may select and set the processing of a specific one of the embodiments to be executed. Alternatively, the processing of a specific one of the embodiments to be executed may be selected in accordance with the type of sensing apparatus connected, as a peripheral device, to a piconet to which the smart device is connected as a central device or the kind of information acquired from the sensing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-129597, filed Jun. 30, 2017, which is hereby incorporated by reference herein in its entirety.

What is claimed is:
1. A communication apparatus for performing intermittent communication with a service providing first apparatus and a service using second apparatus, respectively, using a communication method complying with a Bluetooth standard, comprising:
an acquisition unit configured to acquire a first frequency as a communication frequency in the intermittent communication with the first apparatus and a second fre- quency as a communication frequency in the intermittent communication with the second apparatus; and a request unit configured to transmit, to the second apparatus, a request to change the second frequency to a communication frequency determined based on the first frequency.

2. The apparatus according to claim 1, wherein if a plurality of the first apparatus exist, the request unit transmits, to the second apparatus, a request to change the second frequency to a communication frequency determined based on a communication frequency with at least one of the plurality of first apparatuses, which has transmitted information about a service to the second apparatus, the information being held in each of the plurality of first apparatuses.

3. The apparatus according to claim 2, wherein the information about the service is one of service information and information for identifying the service.

4. The apparatus according to claim 2, wherein the request unit transmits, to the second apparatus, a request to change the second frequency to a smallest value of a communication interval corresponding to the communication frequency with the at least one apparatus which has transmitted the information about the service to the second apparatus.

5. The apparatus according to claim 4, wherein if the second apparatus rejects the request to change the second frequency, the request unit transmits, to the second apparatus, a request to change the second frequency to a communication interval small next to the smallest value among the communication intervals.

6. A communication apparatus for performing intermittent communication with a service providing first apparatus and a service using second apparatus, respectively, using a communication method complying with a Bluetooth standard, comprising:

an acquisition unit configured to acquire a first frequency as a communication frequency in the intermittent communication with the first apparatus and a second frequency as a communication frequency in the intermittent communication with the second apparatus; and a request unit configured to transmit, to the first apparatus, a request to change the first frequency to a communication frequency determined based on the second frequency.

7. The apparatus according to claim 6, wherein if, after transmitting, to the second apparatus, a request to change the second frequency to a communication frequency determined based on the first frequency, the second apparatus rejects the request to change the second frequency, the request unit transmits, to the first apparatus, the request to change the first frequency.

8. The apparatus according to claim 7, wherein if a plurality of the first apparatus exist, the request unit transmits, to the second apparatus, a request to change the second frequency to a communication frequency determined based on a communication frequency with at least one of the plurality of first apparatuses, which has transmitted information about a service to the second apparatus, the information being held in each of the plurality of first apparatuses.

9. The apparatus according to claim 8, wherein the request unit transmits, to the second apparatus, a request to change the second frequency to a smallest value of a communication interval corresponding to the communication frequency with the at least one apparatus which has transmitted the information to the second apparatus.

10. The apparatus according to claim 8, wherein the information about the service is one of information for identifying the service and information for providing the service.

11. The apparatus according to claim 6, wherein if a plurality of the first apparatus exist, the request unit transmits, to at least one of the plurality of first apparatuses, which has transmitted information about a service to the second apparatus, the information being held in each of the plurality of first apparatuses, a request to change a communication frequency with the at least one first apparatus to a communication frequency determined based on the second frequency.

12. A control method for a communication apparatus for performing intermittent communication with a service providing first apparatus and a service using second apparatus, respectively, using a communication method complying with a Bluetooth standard, comprising:

acquiring a first frequency as a communication frequency in the intermittent communication with the first apparatus and a second frequency as a communication frequency in the intermittent communication with the second apparatus; and transmitting, to the second apparatus, a request to change the second frequency to a communication frequency determined based on the first frequency.

13. A non-transitory computer-readable storage medium storing a computer program for causing a computer to execute a control method for a communication apparatus for performing intermittent communication with a service providing first apparatus and a service using second apparatus, respectively, using a communication method complying with a Bluetooth standard, the method comprising:

acquiring a first frequency as a communication frequency in the intermittent communication with the first apparatus and a second frequency as a communication frequency in the intermittent communication with the second apparatus; and transmitting, to the second apparatus, a request to change the second frequency to a communication frequency determined based on the first frequency.

* * * * *